H. Movers,

Casting Car Wheels.

No. 1,344 Reissued Sep. 16, 1862.

Witnesses:
Charles Waterbury
J. A. Potter

Inventor:
Richardson Barum & Co.
assignees of Henry Movers of
Toledo Ohio.
by Wm. D. Bishop
Atty.

N. PETERS, PHOTO-LITHOGRAPHER, WASHINGTON, D. C.

UNITED STATES PATENT OFFICE.

RICHARDSON, BARNUM & CO., OF SALISBURY, CONNECTICUT, ASSIGNEES OF HENRY MOOERS.

IMPROVEMENT IN MODE OF HEATING MOLDS.

Specification forming part of Letters Patent No. 33,846, dated December 3, 1861; Reissue No. 1,344, dated September 16, 1862.

*To all whom it may concern:*

Be it known that we, LEONARD RICHARDSON and WILLIAM H. BARNUM, under the name and firm of RICHARDSON, BARNUM & Co., of the town of Salisbury, county of Litchfield, and State of Connecticut, have become possessed, by assignment duly recorded in the Patent Office, at Washington, in the District of Columbia, in book $P^6$, page 121, of the entire right, title, and interest in and to Letters Patent of the United States granted to HENRY MOOERS, on the 3d day of December, A. D. 1861, for an Improved Mode of Heating Molds, which we believe are inoperative or invalid, by reason of a defective or insufficient description or specification and claim, involving error, which has arisen by inadvertency, accident, or mistake, and without any fraudulent or deceptive intention. We have therefore surrendered said Letters Patent according to the act of Congress in such case made and provided, and have applied for a reissue of the same under the title of "a new and useful machine or apparatus for giving a better and more uniform chill to the tread of cast-iron wheels for railroad-cars, or to other castings of iron that require to be chilled or hardened in the casting or manufacture thereof;" and we do hereby declare the following to be a full, clear, and exact description thereof, reference being had to the accompanying drawings, making a part of this specification, in which—

Figure 1:
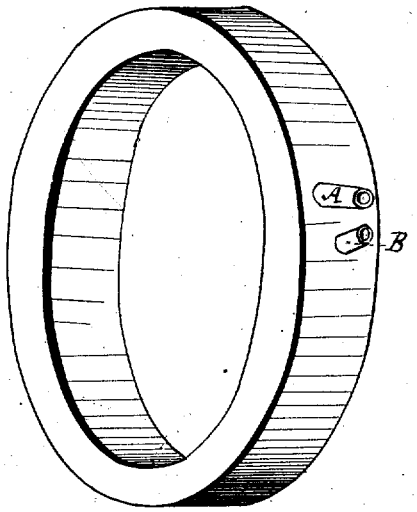
Figure 2:
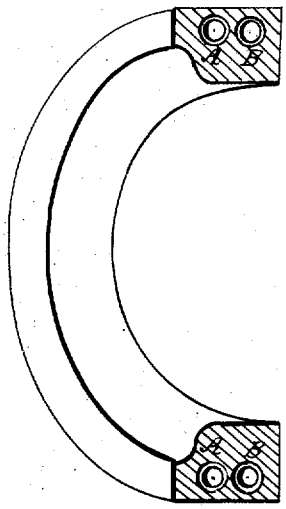

Figure 1 is a perspective view of the entire ring or chill forming part of the mold designed to chill or harden the tread of the wheel, exhibiting the ends A and B of the tubes or openings to receive and pass off the steam or heat for heating the same, as hereinafter described. Fig. 2 is a perspective view of a section of said ring or chill, through the plane of its axis, showing the ends of said section and exhibiting the section of the tubes or openings A and B, designed to convey steam or heat around and through said ring or chill, as hereinafter described.

The same letters indicate like parts in all the figures.

It has been fully determined by experiment that car-wheels, chilled tire, and other castings of iron requiring a chilled surface can be made much more perfect, uniform, and durable when cast in heated chills or molds than when cast in cold chills or molds in the ordinary way.

The nature of said invention consists in providing a hollow mold or chill so arranged and constructed that a current of steam, blaze, or heated air may be admitted inside of the same and may pass around it, thus communicating the desired degree of heat to the surface of the mold or chill.

To enable others to make and use said invention, we will proceed to describe the construction and operation thereof.

The apparatus may be made to consist of a ring or chill cast hollow, with a tube or opening for the steam or heat to enter at A, Fig. 1, and pass around and through the ring or chill, with an aperture for the steam or heat to pass out at B, Fig. 1, or by making a coil of wrought-iron pipe of suitable size to pass around through the inside of the ring or chill once or more, as shown at A and B, Fig. 2, through which steam, blaze, or hot air may be passed, thus communicating any desired degree of heat to the ring, chill, or mold. The ends of said pipe or the openings to the interior of the ring, chill, or mold may be so arranged that several of said molds or chills may be connected together, as they remain in the foundry, and a current of steam, blaze, or heated air forced through them all at the same time.

Having thus described said invention, what we claim therein as new, and desire to secure by Letters Patent, is—

A hollow mold or chill when heated by the introduction of steam, hot air, blaze, or flame, for the purpose of heating the same to the proper temperature to give a more perfect and uniform chill to the treads of cast-iron wheels, chilled tire, or other iron castings whose surfaces require to be hardened.

RICHARDSON, BARNUM & CO.,
By LEONARD RICHARDSON,
WILLIAM H. BARNUM,
*Assignees of Henry Mooers, of Toledo, Ohio.*

Witnesses:
MARTIN PORTER,
JAMES ENSIGN.